S. J. FRITZ.
POTATO DIGGER.
APPLICATION FILED MAR. 11, 1911.
1,021,592.
Patented Mar. 26, 1912.
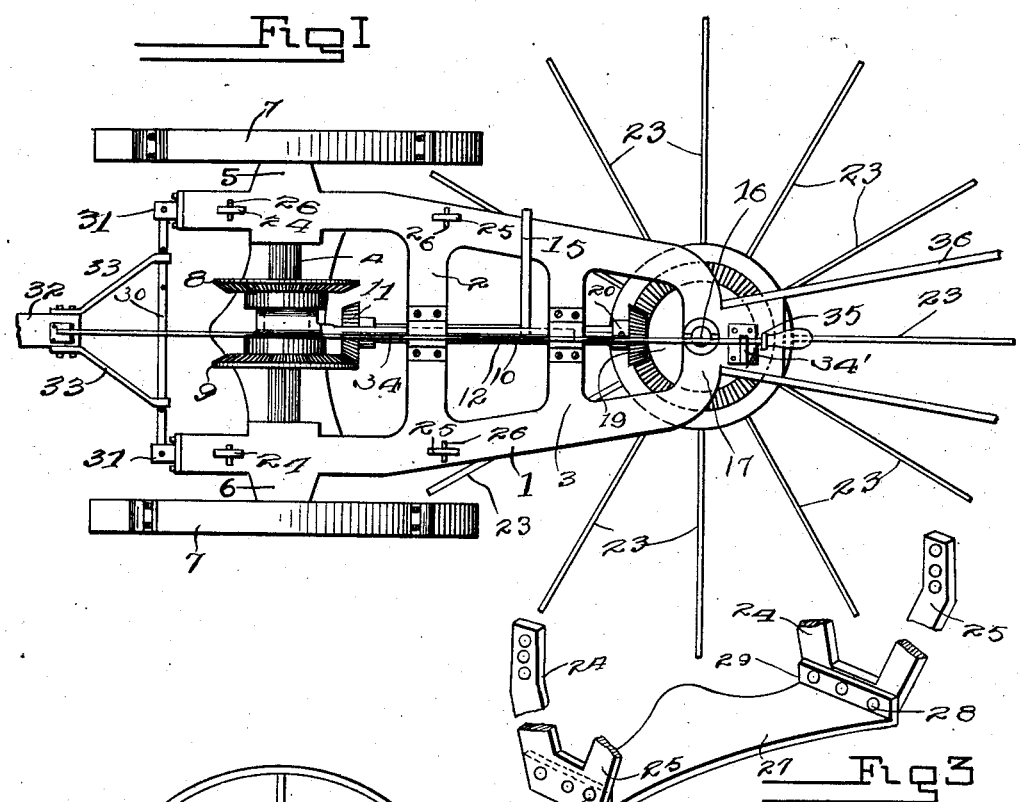
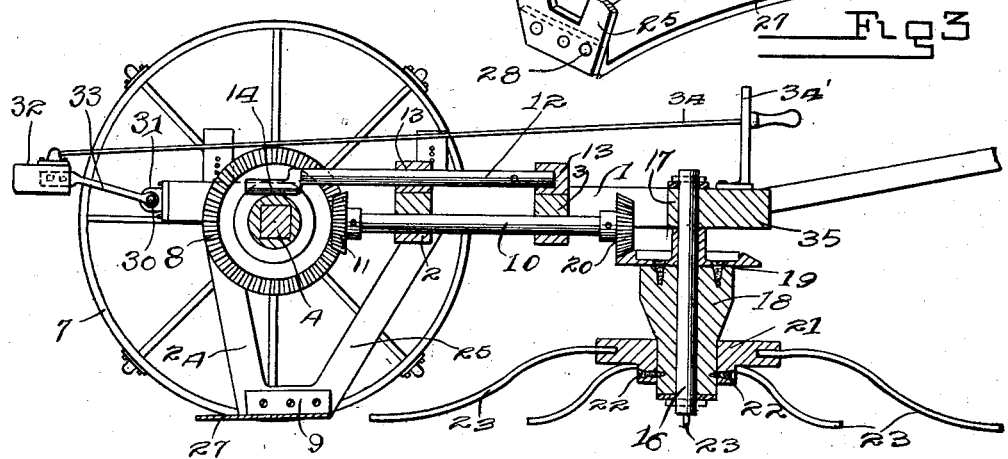
Witnesses
Geo. J. Fritz
Carl W. Fritz
Inventor
Spencer J. Fritz
By E. E. Vrooman,
his Attorney.
COLUMBIA PLANOGRAPH CO., WASHINGTON, D. C.

UNITED STATES PATENT OFFICE.

SPENCER J. FRITZ, OF AVOCA, NEW YORK.

POTATO-DIGGER.

1,021,592.   Specification of Letters Patent.   Patented Mar. 26, 1912.

Application filed March 11, 1911. Serial No. 613,920.

*To all whom it may concern:*

Be it known that I, SPENCER J. FRITZ, a citizen of the United States, residing at Avoca, in the county of Steuben and State of New York, have invented certain new and useful Improvements in Potato-Diggers, of which the following is a specification, reference being had therein to the accompanying drawing.

This invention relates to implements which are used for digging potatoes and other vegetables of a like character and the principal object of the same is to provide a machine in which the digging blade can be adjusted so that there will be no danger of cutting the potatoes and also to provide means for reversing the direction in which the separating tines revolve.

This invention is illustrated in the accompanying drawings, wherein:

Figure 1 is a top plan view of the improved potato digger. Fig. 2 is a vertical sectional view through the improved potato digger. Fig. 3 is an enlarged perspective view of the digging blade and the arms which attach it to the frame of the machine.

Referring to the accompanying drawings by numerals it will be seen that the improved machine comprises a frame 1 which is substantially U-shaped and is provided with cross bars 2 and 3. An axle 4 is journaled on projections 5 and 6 formed on the frame and carries the wheels 7. The portion of the axle between the arms is square as shown in Fig. 2 and carries a collar having a pair of beveled gears 8 and 9 by means of which the separating mechanism is operated. A shaft 10 is journaled in the cross bars 2 and 3 and is provided at one end with a beveled gear 11 which meshes with a selected one of the beveled gears 8 and 9 so that when the machine is moved the shaft 10 will be rotated. A rod 12 is rotatably mounted in the bearings 13 which are mounted upon the upper faces of the cross bars 2 and 3 and is provided at one end with an angular extension 14 which rests upon the collar which connects the beveled gears 8 and 9. An operating lever 15 is mounted upon the rod 12 so that the rod can be turned in order to move the beveled gears to bring the desired one in engagement with the beveled gear 11. By having the portion of the axle between the arms of the frame formed square the beveled gears 8 and 9 are caused to rotate when the machine is moved and by having the beveled gears slidably mounted upon the axle they can be moved longitudinally of the axle so that the desired one will be brought into engagement with the gear 11 and the shaft 10. A vertical shaft 16 is mounted in the bridge 17 of the frame and supports a hub 18 which is provided with a plate 19 having beveled teeth which mesh with a beveled gear 20 mounted upon the opposite end of the shaft 10 from the gear 11. A collar 21 is secured to the hub 18 by means of the screws 22 or any other desired means. A number of divergently arranged tines 23 are mounted in the collar 21, the purpose of which is to separate the potatoes from the dirt so that it will be easy to gather them. A bracket having pairs of arms 24 and 25 is adjustably secured to each side of the forward portion of the frame by having the ends of the arms pass through openings formed through the frame and is held in place by means of pins 26. By means of this construction the brackets can be raised and lowered so that the digging blade 27, which is secured to the lower portions of the brackets by means of the bolts 28 which pass through the end flanges 29 and through the brackets can be adjusted vertically. This blade is positioned just forward of the separating tines so that when the potatoes have been dug up by the blades they will be thrown upon the rapidly moving tines and will be separated from the dirt and thrown to one side of the hill. By having the blade adjustable it can be regulated so that there will be no danger of the blade cutting the potatoes and spoiling them or cutting too deep and throwing up so much dirt that the potatoes could not be separated from the dirt.

A bar 30 is pivotally mounted upon the forward ends of the frame in bearings 31 and carries a tongue 32. This tongue is pivotally mounted on the bar by means of the oblique bars 33 and is provided with a rod 34 which is rigidly connected to the rear end of the tongue and has its opposite end engaged by a suitable catch 34'. When it is desired to change the angle of the blade the rod 34 is moved vertically upon the catch 34' thus changing the angle of the blade carrying frame with respect to the tongue and thus changing the angle of the blade. A dove-tail projection 35 is formed upon the bridge 17 and to it are secured the handles 36 by means of which the machine is guided.

In the operation of this device the machine is driven down a row of potatoes. The blade 27 digs up the potatoes and they pass back upon the rapidly moving tines where they are separated from the dirt and are thrown to one side of the row. If it is desired to have the potatoes thrown in the opposite direction, the lever 15 is moved to the opposite side from that shown in the drawing and the bevel gears 8 and 9 will be moved longitudinally upon the axle 4 so that the gear 8 will be brought into contact with the gear 11 instead of the gear 9.

What I claim is:—

1. In a machine of the character described, a substantially U-shaped frame having a bridge and arms extending from said bridge, bracing bars connecting said arms, a vertical shaft carried by said bridge, a separating wheel rotatably mounted upon said shaft, a gear plate carried by said wheel, a horizontal shaft journaled in said braces, a gear mounted upon one end of said horizontal shaft and engaging said gear plate to rotate said wheel, an axle carried by said frame, gears slidably mounted upon said axle and positioned one on each side of said horizontal shaft, a gear mounted upon the end of said horizontal shaft and positioned between said gears, and means for sliding said gears to bring a desired one of said gears in contact with said last mentioned gear to rotate said horizontal shaft.

2. In a machine of the character described, a frame having a bridge and arms extending from said bridge, cross bars bracing said arms, a vertical shaft carried by said bridge, a separating wheel rotatably mounted upon said shaft, a gear plate secured to the upper portion of said wheel, a horizontal shaft carried by said bracing arms, a gear mounted upon one end of said horizontal shaft and meshing with said plate, a gear mounted upon the opposite end of said horizontal shaft, an axle carried by said frame, a collar slidably mounted upon said axle, gears formed upon said collar and positioned to each side of said last mentioned gear, journals mounted upon the upper faces of said cross bars, a shaft rotatably mounted in said journals, and an angular extension at one end of said last mentioned shaft engaging said collar whereby said collar may be moved to bring a selected one of said gears into engagement with said gear mounted upon said horizontal shaft.

In testimony whereof I hereunto affix my signature in presence of two witnesses.

SPENCER J. FRITZ.

Witnesses:
H. N. CLARK,
C. W. FRITZ.

---

Copies of this patent may be obtained for five cents each, by addressing the "Commissioner of Patents, Washington, D. C."